United States Patent Office 3,029,239
Patented Apr. 10, 1962

3,029,239
BASIC SUBSTITUTED 1- AND 7-ALKYL-XANTHINES OR SALTS THEREOF
Erwin Kohlstaedt, Frankfurt am Main, and Karl Heinz Klingler, Langen, Hesse, Germany, assignors to Chemiewerk Homburg, Zweigniederlassung der Deutschen Gold- und Silber-Scheideanstalt, vormals Roessler (Degussa), Frankfurt am Main, Germany
No Drawing. Filed Oct. 1, 1959, Ser. No. 843,650
Claims priority, application Germany Apr. 17, 1954
7 Claims. (Cl. 260—253)

This invention relates to new and useful xanthine derivatives and is a continuation-in-part of copending application Serial No. 685,802, filed September 24, 1957, now abandoned, which is a continuation-in-part of now abandoned application Serial No. 501,704, filed April 15, 1955.

British patent specification 669,070 discloses the reaction of secondary amines with 7-halogen-alkyl-xanthine compounds to tertiary bases. These compounds are extremely poisonous. Thus, for example, the lethal dose 50 of 7-($\beta$-diethylamino)-theophylline hydrochloride is 182 $\gamma$/g. per mouse. Diuresis tests conducted on rats have shown that urinary excretion decreased by 14% upon administration of 1 mg. of this substance, and increased by 11% two hours after administration of a dose of 5 mg.

Objects of the invention are novel therapeutic agents with remarkably superior pharmaceutic properties in particular for use as diuretics, myocardial stimulants and vaso dilators.

The compounds of the invention include base substituted 1-alkyl-theobromine derivatives having the following general formula (I) 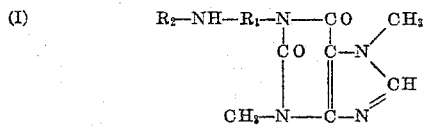

and the halides thereof and base-substituted 7-alkyl-theophylline derivatives having the following general formula (II) 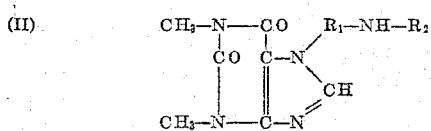

and the halides thereof.

In the above formulas, $R_1$ is an alkyl radical, in particular an alkyl radical with 2 or 3 carbon atoms in its chain and $R_2$ is an alkyl radical, a cycloalkyl group, an aralkyl group, a hydroxy-alkyl group, or an aryl substituted hydroxy-alkyl group.

The compounds of this invention can be prepared by a simple process. 1- or 7-halogen-alkyl-xanthines are reacted with excess primary amines at elevated temperatures, if desired, in a closed vessel. The reaction is preferably carried out at temperatures between 70–170° C. and more particularly between 110–170° C. The amine is preferably used in an excess of 3–4 mols amine per mol halogen-alkyl-xanthine, particularly suitable starting materials for this reaction are 1- or 7-chloro-alkyl-xanthines. However, other halogenated alkyl xanthines such as bromo-alkyl-xanthines may also be used.

It is also possible to operate with about equivalent amounts of xanthine compound and amine. In this case, a process involving operation in the presence of agents splitting off acids, especially in the presence of potassium carbonate, was found to be particularly advantageous.

The reaction may be effected in the presence of solvents, e.g. alcohols or aromatic hydrocarbons. When operating in the presence of potassium carbonate, toluene was found to be particularly advantageous as the solvent.

The resulting endproduct is obtained either directly as halide or in the form of the free base. Salts and bases can easily be interchanged by any known method. Suitable basic components include primary amines which have an alkyl-, cycloalkyl-, aralkyl-, hydroxy-alkyl- or aryl-hydroxy-alkyl group substituted at the nitrogen atom.

The base substituted 1-alkyl-theobromines and 7-alkyl-theophyllines prepared in accordance with the invention as well as their respective salts are water soluble. They can either be applied directly as medicaments or they can be used as intermediate products for the preparation of medicaments. As compared to known products, these compounds are distinguished by their considerably lower toxicity.

Furthermore, they possess valuable therapeutic properties and the combination of all these qualities make them superior medicaments as compared to known products.

For example, the lethal dose 50 of 7-($\beta$-ethyl-amino-ethyl)-theophylline hydrochloride is 670 $\gamma$/g. per mouse. Diuresis tests conducted with rats show that upon administration of 1 mg., excretion of urine increased by 5.5%, upon administration of 5 mg. it increased by 37% after a period of two hours.

The surprising therapeutic effect of the corresponding theobromine compounds prepared in accordance with the invention over known tertiary bases is obvious from the following comparisons:

(1) In tests conducted with isolated beating frog hearts the following increase in the stroke volume was observed upon treatment with the theobromine compounds in a dilution of 1:100,000:

| Compound | Increase of Stroke Volume in percent |
|---|---|
| Methylamino-ethyl-theobromine hydrochloride | 53 |
| Ethylamino-ethyl-theobromine hydrochloride | 8 |
| Propylamino-ethyl-theobromine hydrochloride | 20 |
| Isopropylamino-ethyl-theobromine hydrochloride | 15 |
| Cyclohexylamino-ethyl-theobromine hydrochloride | 20 |
| Benzylamino-ethyl-theobromine hydrochloride | 24 |

With the exception of isopropylamino-ethyl-theobromine, all the above listed derivatives had the effect of reducing the residual volume.

In contrast thereto, the known diethylamino-ethyl-theobromine hydrochloride has the effect of reducing the stroke volume by 50% and of increasing the residual volume by 89%.

(2) The diuretic effect of the secondary amino compounds are similar to those of the tertiary amines. However, the toxicity of the theobromine compounds prepared in accordance with the invention is considerably lower. The following LD 50 values were obtained upon intraperitoneal injection into mice:

| Compound | Mg./kg. |
|---|---|
| Methylamino-ethyl-theobromine hydrochloride | 1,530 |
| Ethylamino-ethyl-theobromine hydrochloride | 1,180 |
| Propylamino-ethyl-theobromine hydrochloride | 990 |
| Isopropylamino-ethyl-theobromine hydrochloride | 1,200 |
| Diethylamino-ethyl-theobromine hydrochloride | 427 |

(3) The therapeutic superiority of the compounds according to the invention is also apparent from the following data on the coronary dilatation obtained in tests which were conducted on dogs:

| Compound | Coronary Dilatation (in parts of theophylline effect) |
|---|---|
| Ethylamino-ethyl-theobromine hydrochloride | 0.1 |
| Benzylamino-ethyl-theobromine hydrochloride | 0.25 |
| Diethylamino-ethyl-theobromine hydrochloride | 0.05 |

The same is true for the base substituted 1- or 7-alkyl-xanthine derivatives which in the amino group are substituted with an hydroxyalkyl radical or an aryl-substituted hydroxyalkyl radical.

Although all compounds prepared according to the invention are superior to the known compounds because of their low toxicity, their solubility in water and their improved therapeutic properties, they differ as to their respective effectiveness in certain field of application. Thus, the pharmacological properties of aralkylamino-alkyl-theophyllines differ, for example, from those of alkyl-amino-alkyl-theophyllines in the following respects.

The average changes in the power of contraction of isolated papillary muscles of cats observed 10 minutes after addition of ¼ mM./l. were as follows:

| | Percent |
|---|---|
| Benzylamino-ethyl-theophylline hydrochloride | +158 |
| β-Phenylethylamino-ethyl-theophylline hydrochloride | +131 |
| Ethylamino-ethyl-theophylline hydrochloride | −81 |

In tests conducted with cats, the following hypotensive effects were observed:

| Compound | Hypotensive effect (in parts of the Theophylline Effect) |
|---|---|
| Benzylamino-ethyl-theophylline hydrochloride | 1 |
| β-Phenylethylamino-ethyl-theophylline hydrochloride | 1 |
| Ethylamino-ethyl-theophylline hydrochloride | 0.1 |

The invention is illustrated in the following examples.

Of particular pharmacological interest are the phenyl-isopropyl-aminoalkyl xanthine derivatives. These compounds are highly active as central stimulants without simultaneously exerting an unfavorable influence on the circulation, e.g. by undesirable increases in blood pressure. This one-sided high activity as central stimulants of the compounds is superior to that of all agents hitherto used for this purpose.

Example 1

48.4 g. of 7-(β-chloroethyl)-theophylline, 130 ml. of a 15% alcoholic solution of methylamine and 600 ml. of ethanol are given into an autoclave and agitated for 5 hours at 120 to 130° C. The reaction solution is slightly acidified with alcoholic hydrochloric acid and evaporated. After recrystallisation of the dry residue from ethanol, there is obtained 32 g. of 7-(β-methyl-amino-ethyl)-theophylline-hydrochloride, melting point 241° to 243° C.

Example 2

21 parts of a 50% alcoholic solution of ethylamine are added to 18.5 parts of 7-(β-chloroethyl)-theophylline in approximately 350 ml. of ethyl alcohol and agitated 4 to 5 hours in an autoclave at a temperature of 130–140° C. After evaporation, the residue is triturated with some acetone and sucked-off. There are obtained approximately 15 to 16 parts of 7-(β-ethylamino-ethyl)-theophylline hydrochloride, melting point 258° C., which, if desired, can be recrystallized from methanol.

Example 3

A mixture of 95 g. of 7-(β-chloroethyl)-theophylline, 69 g. of n-propylamine and 1000 ml. of methanol is heated for 4 hours in an autoclave at 120 to 130° C. The reaction solution is evaporated and the residue washed with a small amount of acetone and recrystallized from ethyl alcohol. There is obtained 70 g. of 7-(β-n-propylamino)-ethyl-theophylline hydrochloride, melting point 241 to 243° C.

Example 4

48.4 g. of 7-(β-chloroethyl)-theophylline, 36 g. of isopropyl-amine and 500 ml. of methanol are agitated in an autoclave for 4 hours at 130–135° C. The reaction solution is evaporated to dryness and the residue purified by heating with isopropanol to boiling temperature. In this manner there is obtained 32.7 g. of 7-(β-isopropylamino-ethyl)-theophylline hydrochloride, melting point 257 to 260° C.

Example 5

25 g. of 7-(β-bromoethyl)-theophylline, 22.3 g. of isoamylamine and 30 ml. of propyl alcohol are boiled for 7 hours under reflux. After cooling the mixture is acidified with alcoholic hydrochloric acid and filtrated off after 2 days. The filtered is evaporated and the remaining 7-(isoamyl-amino-ethyl)-theophylline hydrochloride subsequently recrystallized from ethanol, melting point 223–226° C.

Example 6

10 g. of 7-(γ-chloropropyl)-theophylline are reacted with 16.9 g. of a 36% solution of ethylamine in 200 ml. methanol at 130 to 140° C. in an autoclave. After 8 hours the solution is evaporated and the residue recrystallized from methanol. There is obtained 5.5 g. of 7-(γ-ethylamino-propyl)-theophylline hydrochloride, melting point 263° to 265° C.

Example 7

According to the procedure of Example 2 and using 35.5 g. of 7-(β-chloroethyl)-theophylline and 48 g. of cyclohexyl-amine in 400 ml. of methanol there is obtained 25 g. of 7-(β-cyclohexylaminoethyl)-theophylline hydrochloride, melting point 274° to 276° C.

Example 8

A mixture of 23 parts of benzylamine and 17.4 parts of 7-(β-chloroethyl)-theophylline in about 300 ml. of absolute ethanol is agitated in an autoclave, the temperature being raised within one hour from about 110° to about 165° C. The heating is then stopped and the agitation continued until room temperature is reached again. The alcohol is almost completely distilled off in vacuo, sucked-off from the separated benzyl-ammonium chloride and the resulting filtrate acidified with alcoholic hydrochloric acid. The resulting precipitation is completed by the addition of absolute ether. The hydrochloride is filtered off and the residue extracted by boiling with methanol in order to remove the benzyl-ammonium-chloride. After cooling, the 7-(β-benzyl-amino-ethyl)-theophylline hydrochloride which has remained undissolved is sucked-off. There is obtained approximately 18 to 20 parts of 7-(β-benzyl-amino-ethyl)-theophylline hydrochloride, melting point 260° to 265° C.

Example 9

50.8 g. of 7-(β-chloroethyl)-theophylline, 30 ml. of absolute ethyl alcohol and 62.8 g. of β-phenyl-ethylamine are heated for 19 hours in an oil bath at 136° to 140° C. The precipitated crystalline mass was filtered off in vacuo, washed with a small amount of alcohol and the filtrate acidified with alcoholic hydrochloric acid. There is obtained 66 g. of 7-(β-phenyl-ethylamino-ethyl)-theophylline hydrochloride which after filtration is purified by boiling with alcohol, melting point 229° C.

Example 10

1 mol of 7-(β-chloroethyl)-theophylline and 2½ mols of α-methyl-β-phenyl ethylamine are heated for 6 hours in an oil bath, if necessary with addition of alcohol or toluene. The reaction mixture is diluted with alcohol and acidified with alcoholic hydrochloric acid. The crystalline mass formed is filtered with suction and extracted by boiling with alcohol. A product having a melting point of 237 to 239° C. is formed. With prolonged extraction by boiling with alcohol, the melting point of the mass falls, preferably due to a change in modification, to 227 to 229° C. However, analysis shows that both products are the pure condensation product.

Instead of the chloroethyl theophylline, it is also possible to use the corresponding bromine derivative. It was found that in this way the process is facilitated and the yield is improved.

The corresponding theobromine derivative is obtained under the same reaction conditions and using the same ratios of reactants.

Example 11

24.2 g. of 1-chloroethyl-theobromine, 400 ml. of methanol and 62 ml. of a 15% alcoholic solution of methylamine are heated for 4 hours in an autoclave at 120° to 130° C. The reaction mixture is evaporated and the residue washed with acetone and chloroform and subsequently recrystallized from methanol. There is thus obtained 17.5 g. of 1-($\beta$-methylamino-ethyl)-theobromine hydrochloride, melting point 272° to 274° C.

Example 12

50 g. of 1-chloroethyl-theobromine, 76 ml. of a 37% alcoholic solution of ethylamine and 500 ml. of methanol are given in an autoclave and agitated 4 hours at 125° to 130° C. After distilling off the solvent, the residue is repeatedly purified by boiling with absolute alcohol. In this manner there is obtained 46 g. of 1($\beta$-ethylamino-ethyl)-theobromine hydrochloride, melting point 286° to 289° C.

Example 13

48.4 g. of 1-chloroethyl-theobromine, 36 g. of n-propylamine and 400 ml. of methanol are agitated in a steel autoclave for three hours at 125° to 135° C. There is obtained 43.8 g. of 1($\beta$-n-propylamino-ethyl)-theobromine hydrochloride, melting point 218° C.

Example 14

According to the method of Example 13 and using 48.4 g. of 1-chloroethyl-theobromine and 36 g. of isopropylamine there is obtained 28 g. of 1-($\beta$-isopropylamino-ethyl)-theobromine-hydrochloride, melting point 241° to 244° C.

Example 15

41.5 g. of 1-chloroethyl-theobromine, 600 ml. of methanol and 71.5 g. of cyclohexylamine are heated in an autoclave for 6 hours at 130° C. The methanol solution is evaporated, and the residue dissolved in ethanol, acidified with alcoholic hydrochloric acid and precipitated with acetone. There is obtained 47 g. of 1-($\beta$-cyclohexylamino-ethyl)-theobromine hydrochloride, melting point 180° to 183° C.

Example 16

27 g. of 1-chloroethyl-theobromine are heated for 8 hours under reflux with 41.2 g. of benzylamine and 20 ml. of ethanol. Part of the solution is evaporated and the residue acidified with alcoholic hydrochloric acid. After recrystallization from ethanol there is obtained 18 g. of 1-($\beta$-benzylamino-ethyl)-theobromine hydrochloride with a melting point of 224° to 226° C.

Example 17

48.4 g. of 7-($\beta$-chloroethyl)-theophylline and 30.4 g. of monoethanolamine are heated for 7 hours in an oil bath at 130° to 150° C. The mixture is subsequently dissolved in ethylalcohol and acidified with alcoholic hydrochloric acid. 41 g. of 7-(hydroxyethylamino-ethyl)-theophylline hydrochloride are precipitated and recrystallized from ethyl alcohol. Decomposition occurs at 228° C.

Example 18

A mixture of 30 g. of D,L-norephedrine, 25 g. of 7-($\beta$-chloroethyl)-theophylline and 50 ml. of xylene is boiled for 6 hours under reflux. After subsequent addition of the same volume of ethyl-alcohol 7-($\beta$-[phenyl-hydroxy-isopropylamino]-ethyl)-theophylline hydrochloride is precipitated by adding alcoholic hydrochloric acid. After filtering off in vacuo and purification by boiling with ethyl alcohol the yield amounts to 39.8 g. of the product, melting point 244° C. Any D,L-norephedrine which has not been reacted may be recovered from the alcoholic mother liquor.

Example 19

73 g. of 7-($\beta$-chloroethyl)-theophylline are introduced into 113 g. of molten 1-norephedrine and the mass kept for 6 hours at 120° to 130° C. The reaction mixture is thereupon dissolved with 500 ml. of boiling ethyl-alcohol and after cooling off adjusted to a pH-value of about 4 with alcoholic hydrochloric acid. Hereby 1-7-($\beta$-[phenyl - hydroxy - isopropylamino] - ethyl) - theophylline-hydrochloride is precipitated. After filtration the product is purified by boiling with 400 ml. of ethyl alcohol and, upon cooling, filtered again. The produce melts at 242°–244° C. under decomposition.

Example 20

A mixture of 9.7 g. of 1-($\beta$-chloroethyl)-theobromine, 15 g. 1-norephedrine and 5 ml. of absolute ethyl-alcohol are heated for 8 hours at 110° to 125° C. 80 ml. of absolute ethyl-alcohol are added and the mixture acidified with alcoholic hydrochloric acid. Hereby 13 g. 1-1-($\beta$-[phenyl-hydroxy-isopropylamino]-ethyl)-theobromine hydrochloride is precipitated. The product is purified by heating with absolute ethyl-alcohol to boiling point (melting point 241° to 242.5° C.).

Example 21

23 g. of $\beta$-hydroxy-$\beta$-phenyl-ethylamine, 21.2 g. of 7-($\beta$-bromoethyl)-theophylline and 15 ml. of ethyl alcohol are heated under reflux for 15 hours. The mixture is diluted with 30 ml. of ethyl alcohol and neutralized with alcoholic bromhydric acid. After standing for several days in a refrigerator, the product is filtered off in vacuo and twice recrystallized from ethyl alcohol. In this manner there is obtained 13 g. of 7-($\beta$-hydroxy-$\beta$-phenyl-ethylamino-ethyl)-theophylline hydrobromine, melting point 182° to 183° C.

Example 22

From the phenyl isopropyl aminoethyl theophylline hydrochloride of Formula I as described in Example 10, the two optical antipodes are produced:

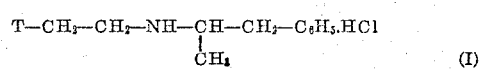
(I)

D - 7 - ($\beta$ - phenylisopropylaminoethyl) - theophylline hydrochloride. 34.4 g. of 7-($\beta$-bromethyl)-theophylline, 16.3 g. of 1-phenylisopropylamine and 25 g. of powdered potassium carbonate are boiled under reflux in 35 cc. of toluene for 4 hours while stirring. The mixture is thereafter diluted with 20 cc. of isopropyl alcohol and acidified with hydrochloric acid containing isopropyl alcohol. The precipitated hydrochloride is filtered with suction, and twice extracted by boiling with isopropyl alcohol for purification purposes. The melting point is 246 to 247° C.; the yield is 75% of the theoretical. The l-form is prepared in analogous manner and this also melts at 246 to 247° C.

Example 23

The theobromine derivative of the following Formula II is obtained by reacting 1-($\beta$-chloroethyl)-theobromine with phenyl isopropylamine, corresponding to the process of the analogous theophylline derivative.

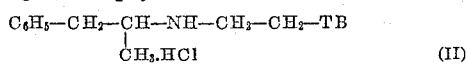
(II)

After drying the recrystallised product in vacuum at 150 to 160° C., the substance melts at 200 to 202° C.

*Example 24*

7 - (α - ethyl - β - phenyl - ethylaminoethyl) - theophylline-hydrochloride of Formula III

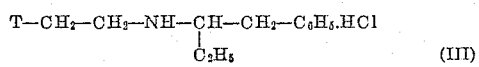
(III)

This product is prepared by the process described in Example 22 from α-ethyl-β-phenylethylamine and bromethyl theophylline. The melting point is 210 to 211° C.

We claim:

1. 7 - (phenyl - isopropyl - amino - ethyl) theophylline hydrochloride.
2. 7 - (β - hydroxy - β - phenyl - ethylamino - ethyl) theophylline hydrobromide.
3. 1 - 7 - (β - [phenyl - hydroxy - isopropylamino]-ethyl)-theophylline hydrochloride.
4. 1 - 7 - (β - [phenyl - hydroxy - isopropylamino]-ethyl)-theobromine hydrochloride.
5. 7 - (β - benzylamino - ethyl) - theophylline hydrochloride, melting point 260 to 265° C.
6. 7 - (β - phenyl - ethylamino - ethyl) - theophylline hydrochloride, melting point 229° C.
7. A compound selected from the group consisting of theophylline derivatives having the formula

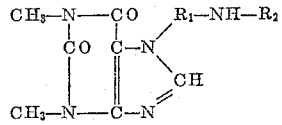

and theobromine derivatives having the following formula:

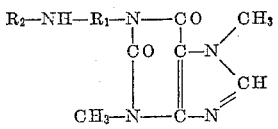

and the halides thereof, in which formulae $R_1$ is an alkyl radical with 2–3 carbon atoms and $R_2$ is a member selected from the group consisting of lower alkyl radicals, cyclohexyl, benzyl, phenylethyl, phenylisopropyl, α-ethyl-β-phenylethyl, hydroxyethyl, phenylhydroxyethyl and phenylhydroxy-isopropyl groups.

References Cited in the file of this patent

Rojahn et al.: Chem. Abs., vol. 25, p. 1031 (1931).
Zelnik et al.: Bull. Soc. Chim., France, T. 23, pp. 1773–1777 (1956).